(12) United States Patent
Flavelle

(10) Patent No.: US 8,316,874 B2
(45) Date of Patent: Nov. 27, 2012

(54) PRESSURE PLENUM FLOW DIVIDER

(75) Inventor: William D. Flavelle, Hoschton, GA (US)

(73) Assignee: Roper Pump Company, Commerce, GA (US)

( * ) Notice: Subject to any disclaimer, the term of this patent is extended or adjusted under 35 U.S.C. 154(b) by 438 days.

(21) Appl. No.: 12/432,410

(22) Filed: Apr. 29, 2009

(65) Prior Publication Data

US 2009/0266422 A1      Oct. 29, 2009

Related U.S. Application Data

(60) Provisional application No. 61/048,798, filed on Apr. 29, 2008.

(51) Int. Cl.
*G05D 11/02*      (2006.01)
(52) U.S. Cl. .................. 137/99; 418/199; 418/206.1
(58) Field of Classification Search .............. 137/99, 137/101, 98; 418/200, 9, 10, 15, 196, 199, 418/206.1
See application file for complete search history.

(56) References Cited

U.S. PATENT DOCUMENTS

| | | | | |
|---|---|---|---|---|
| 796,724 | A * | 8/1905 | Hewitt | 184/31 |
| 2,678,657 | A * | 5/1954 | Schaffer et al. | 137/99 |
| 2,873,889 | A * | 2/1959 | Mori | 222/134 |
| 3,272,140 | A * | 9/1966 | Curry et al. | 418/196 |
| 4,328,824 | A * | 5/1982 | Kiernan et al. | 137/99 |
| 4,531,535 | A | 7/1985 | Kiernan et al. | |
| 6,431,198 | B2 * | 8/2002 | Walton et al. | 137/99 |
| 6,854,257 | B2 * | 2/2005 | Leblanc et al. | 60/39.281 |
| 6,857,441 | B2 | 2/2005 | Flavelle | |
| 2003/0223896 | A1 * | 12/2003 | Gilbert et al. | 418/9 |

* cited by examiner

*Primary Examiner* — Craig Schneider
*Assistant Examiner* — Kevin Murphy
(74) *Attorney, Agent, or Firm* — Ceasar, Rivise, Bernstein, Cohen & Pokotilow, Ltd.

(57) ABSTRACT

A fluid metering or pumping device includes multiple pumping or metering elements that are connected so that they all operate together, moving in the same direction and at the same speed. The multiple pumping or metering elements are intended for use at high pressures where the strain from the pressure might distort the walls of the elements, and interfere with their pumping or metering accuracy. These elements are enclosed in, but preferably not directly connected to a pressure vessel that would contain the high operating pressure, leaving the pumping or metering element housings to only contain the pressure rise or fall that occurs within that element. The pumping or metering elements are connected to a support structure that also penetrates the pressure vessel, and contains an outlet port for that element. The pressure vessel connects the elements, and serves as an intake plenum for all of the elements.

20 Claims, 4 Drawing Sheets

PRESSURE PLENUM FLOW DIVIDER

CROSS-REFERENCE TO RELATED APPLICATIONS

This application claims the benefit under 35 U.S.C. §119(e) of U.S. Provisional Patent Application No. 61/048,798, filed on Apr. 29, 2008 entitled FLOW DIVIDER whose entire disclosure is incorporated by reference herein.

BACKGROUND OF THE INVENTION

1. Field of Invention

This invention relates generally to devices for regulating the flow of liquids, and particularly relates to a flow divider for dividing a stream of liquid, such as liquid fuel, into two or more smaller streams of liquid or to a pump for pumping a single flow of liquid to one or more locations in substantially accurate flow rates.

2. Description of Related Art

When working with liquids, it is often desirable to divide a single stream of liquid into several smaller, preferably equal streams of liquid or several substantially accurate streams of liquid. This is typically done using a fluid metering device such as liquid flow divider, an equal-flow pump, or an equal-flow liquid motor.

A typical prior art liquid flow divider is taught in U.S. Pat. No. 4,531,535 to Kiernan. As shown in FIG. 4 of Kiernan, such liquid flow dividers typically include multiple dividing units of two intermeshed spur gears. The various dividing units are typically linked together by a drive train that may include a drive line, drive shafts, or a sun gear. As a result of this linkage, all of the gears within the various dividing units rotate at substantially the same speed.

Within each individual dividing unit, a liquid inlet port is positioned on one side of the intermeshing portion of the pair of spur gears, and a liquid discharge port is positioned on the other side of the intermeshing portion of the pair of spur gears. A housing is provided that conforms to the exterior portions of the spur gears that are not in communication with the liquid inlet port or the liquid discharge port. All of the various dividing units' liquid inlet ports are in communication with a single, pressurized liquid source.

In operation, pressurized liquid from the pressurized liquid source first enters each dividing unit's liquid inlet port. The pressurized liquid then causes the gears in each dividing unit to rotate in opposite directions so that each gear's teeth carry liquid from the liquid inlet port, around the exterior portion of the gear, and into the liquid discharge port. Because all of the dividing gears within the liquid flow divider are preferably the same size and shape, and because the gears are linked together by a central drive train so that all of the gears rotate at the same rate, the flow rate of liquid around each of the flow divider's various gears is identical to the flow rate of liquid around each of the flow divider's other gears. Accordingly, because each dividing unit contains two gears of substantially the same size that convey liquid from the dividing unit's liquid inlet port to the dividing unit's liquid discharge port, liquid flows through each dividing unit at a rate that is equal to two times the rate at which the liquid flows around a single gear.

Accordingly, prior art liquid flow dividers are typically designed to include one dividing unit for each equal discharge stream that the flow divider is to produce. For example, if the flow divider is to produce 10 equal discharge streams of liquid, the flow divider will include 10 separate dividing units. The liquid fuel entering the flow divider normally enters at an elevated pressure relative to ambient conditions. Then it exits the flow divider normally at a discharge line pressures that are lower than the inlet pressure since energy is lost in making the gears rotate. This elevated pressure inside the flow divider exerts forces on the housings of the dividing units that are proportional to the difference between the pressure inside the flow divider and ambient pressure outside the flow divider. This force on the housing can, when the difference in pressure is high enough, cause the housings to expand, change shape, and deform, and detrimentally affect the diving units' metering efficiency or impair their rotation.

Flow dividers have been developed that did away with this deformation of the dividing units by enclosing them inside a pressurized plenum. The pressure plenum would contain the high pressure of the fuel, and be subjected to the large forces resulting from the difference between the liquid pressure inside the flow divider and ambient atmospheric pressure outside. The dividing units themselves would be subjected to only the much smaller pressure differences generated by the liquid passing through them. This type of flow divider, usually denoted a "circular flow divider", has the dividing units arranged in a circular array around a central timing gear or sun gear. This timing gear intermeshes with the innermost gears in all dividing units to synchronize and cause all dividing units to always rotate at the equal speeds. A large, circular housing or plenum contains all of these dividing units and functions as a pressure vessel. The liquid fuel enters the flow divider through a port or ports in this circular housing and fills its volume so as to submerge the dividing units. The pressurized liquid fuel is forced into each dividing unit through an inlet port hole in each one.

U.S. Pat. No. 6,857,441 to Flavelle ("Flavelle") solved some problem of the earlier art by providing a pressure balance inlet port and a pressure balance discharge port adjacent an exterior portion of each end gear within a series of gears for balancing forces exerted on the end gear by liquid passing through the various inlet and discharge ports. However, there continues a need for improved liquid flow dividers, and other fluid metering devices, that are more robust and that take up less space than prior art fluid metering devices.

All references cited herein are incorporated herein by reference in their entireties.

BRIEF SUMMARY OF THE INVENTION

In accordance with an example of the preferred embodiments, the invention includes a flow divider having a plenum as a pressure containing vessel, a plurality of dividing units housed within and distinct from the plenum, a connecting shaft, and a support structure coupled to the plenum. Each dividing unit includes a plurality of intermeshed driving gears and is aligned with another one of the dividing units so that the driving gears of the respective dividing units are coaxial. The connecting shaft mechanically connects the driving gears of one of the dividing units with the driving gears of an aligned dividing unit to form adjoining driving units. The driving gears of both of the adjoining dividing units are connected by the connecting shaft to rotate at the same speed. The dividing units have an outlet port in fluid communication with one of the dividing units.

In accordance with another example of the preferred embodiments, the flow divider includes a plurality of dividing units containing intermeshing driving gears, with the dividing units arranged so the intermeshing driving gears are coaxial and so that they all rotate together. The flow divider also includes a pressure containing vessel that surrounds, but is separate from, that is, not part of, the dividing units. The pressure containing vessel forms an inlet plenum conducting liquid to all of the dividing units simultaneously. In addition, the flow divider includes a support structure that secures each dividing unit and contains individual outlet ports for each dividing unit surrounded by the pressure containing vessel.

BRIEF DESCRIPTION OF SEVERAL VIEWS OF THE-DRAWINGS

The invention will be described in conjunction with the following drawings in which like reference numerals designate like elements and wherein.

DETAILED DESCRIPTION OF THE INVENTION

Figure 1:
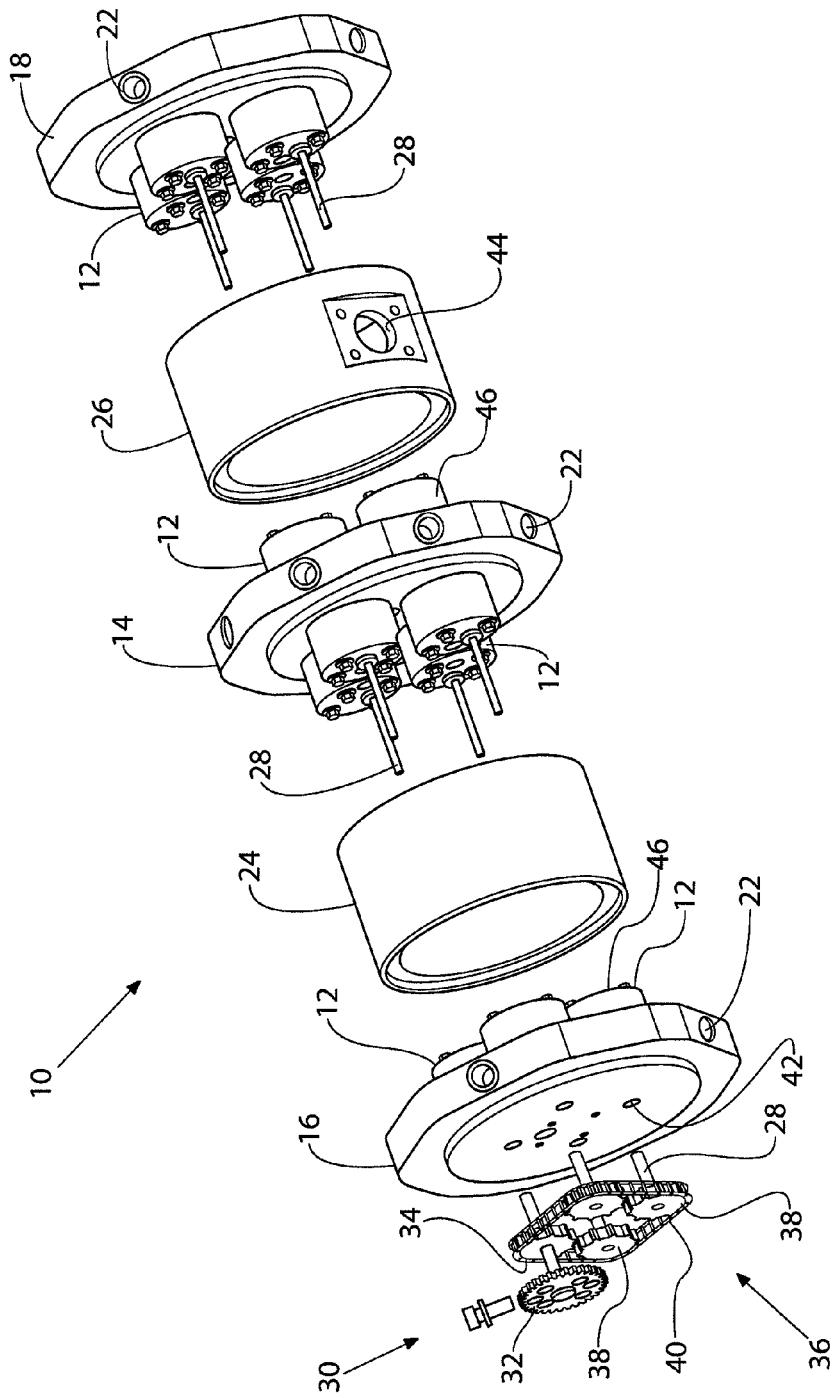
FIG. 1 is an exploded view of a flow divider in accordance with an exemplary embodiment.

The preferred embodiments of the invention provide a more economical means of producing the pressure plenum flow divider by orienting and mechanically linking the dividing units in linear fashion, eliminating the large timing gear or sun gear, reducing the overall diameter, and separating the pressure vessel function from the dividing units themselves. FIG. 1 depicts an exemplary flow divider 10. As can be seen in FIG. 1, the flow divider 10 includes a plurality of dividing units 12 as flow elements mounted onto one of a plurality of support structures 14, 16, 18.

Each support structure 14, 16, 18 is preferably a metal and/or alloy disk having apertures and passages within for fluid communication as discussed, for example, in greater detail below. In particular, each support structure includes an internal passage 20 (FIG. 4) leading from the discharge of each dividing unit through the support structure to a port 22 on the peripheral edge of each support structure. While not being limited to a particular theory, the support structures each include a number of outlet ports 22 corresponding to a number of dividing units coupled to the support structure, with each port dedicated to the output of a respective one of the coupled dividing units. According, the support structure 14 has eight ports 22 for its attached eight dividing units 12, while the support structures 16 and 18 each have four ports 22 for their respectively attached four dividing units.

Still referring to FIG. 1, passages (e.g., conduits) through the dividing units 12 and the support structure 14,16,18 allow incoming liquid to pass through a plenum input port 44 and fill the plenum volumes within tubular rings 24, 26 on both sides of the support structures, as described in greater detail below. For purposes of clarity, the support structure 14 will also be referred to as the center support structure, the support structure 16 will also be referred to as the proximal support structure, and the support structure 18 will also be referred to as the distal support structure.

A first tubular pressure containing ring 24 connects to and seals against the support structures 14 and 16. Likewise, a second tubular pressure containing ring 26 connects to a seals against the support structures 14 and 18. A connecting shaft 28 runs through the tubular ring 24 and mechanically connects intermeshed driving gears 52, 54 within the two dividing units 12 so the connected dividing units rotate at the same speed. This layout of connecting shafts 28 to aligned opposing dividing units 12 is repeated until the flow divider 10 contains the desired quantity of dividing units. The dividing units 12 and support structures 14, 16, 18 further include passages, that along with the open volumes inside the tubular pressure rings 24, 26, create a continuous inlet plenum for communicating fuel to all of the flow elements simultaneously. Of course, the at least one of the tubular pressure containing ring, here pressure ring 26 also includes a plenum input port 44 for receiving the fluid, as readily understood by a skilled artisan.

A gear unit 30 includes a small driving gear 32 coupled to a connecting shaft 28 that connects to a first split gear 34 of a split gear unit 36. The first split gear 34 is linked to second, third and fourth split gears 38 by a positive drive mechanical linkage unit 40 (e.g., chain, timing belt, spur, tooth gear). Each of the split gears is coupled to a respective connecting shaft 28. The connecting shafts extend through aligned apertures 42 of the support structure 16 and mechanically link the split gears 34, 38 to the respective dividing unit 12 on the opposite side of the support structure. The connecting shafts 28 therefore orient and mechanically link the dividing units 12 in linear fashion, while eliminating the large sun gear found in known flow dividers. The arrangement of four lines of dividing units reduces overall diameter. Moreover, the tubular rings separate the pressure vessel function from the dividing units themselves. It is understood that the gear unit 30 is one example of an apparatus for controlling or equalizing the rotational speed and direction of the dividing units within the flow divider, and that the invention is not limited to any one configuration.

It should be noted that the number of dividing units mounted to each support structure is not limited. Also, dividing units may be mounted on one or both sides of the support structures, as shown, for example by the dividing units 12 mounted on both sides of the support structure 14, and on only one side of the support structure 16 and 18. The actual number of dividing units and their locations can be chosen to obtain the required number of discharges in the smallest package. When only one dividing unit 12 is attached to a side of a support structure, it can be mounted so the rotational axis of the driving gear coincides with the center of the support structure. Doing so eliminates the need to accurately align the support structures rotationally to one another to prevent binding of the interconnecting drive shafts.

Figure 2:
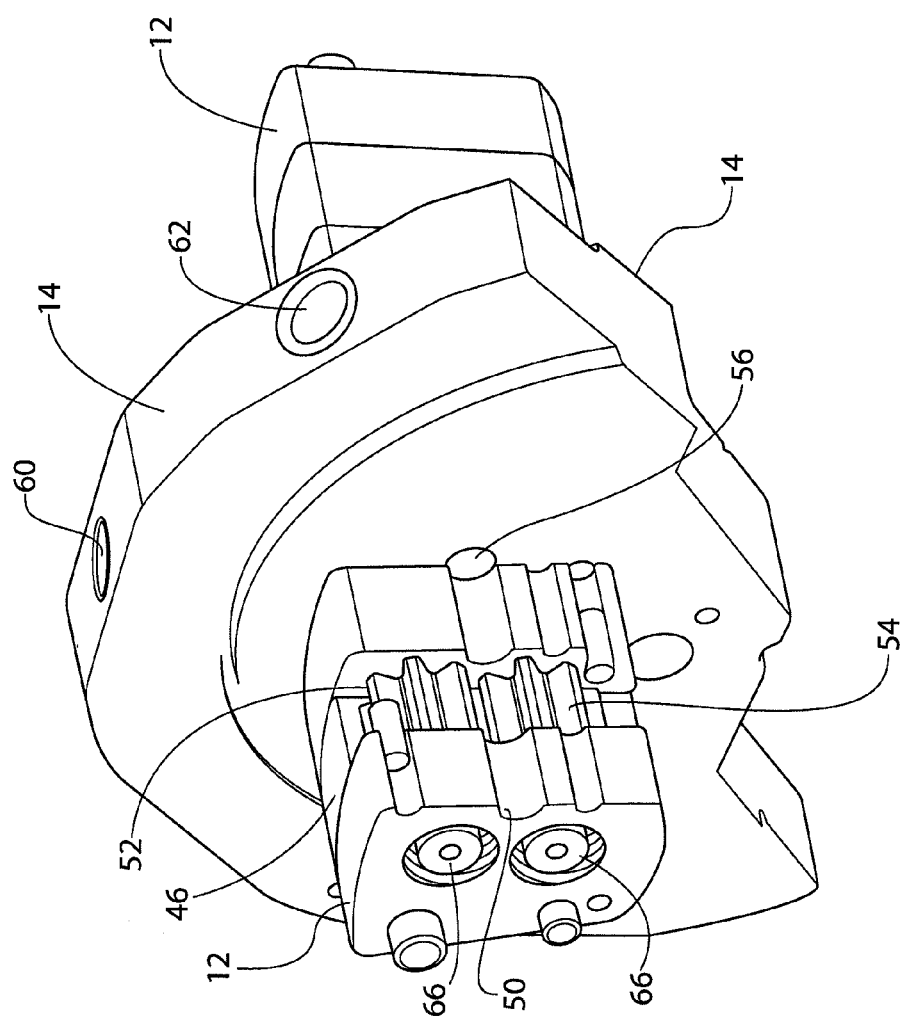
FIG. 2 is a partial view of an exemplary dividing unit.
Figure 4:
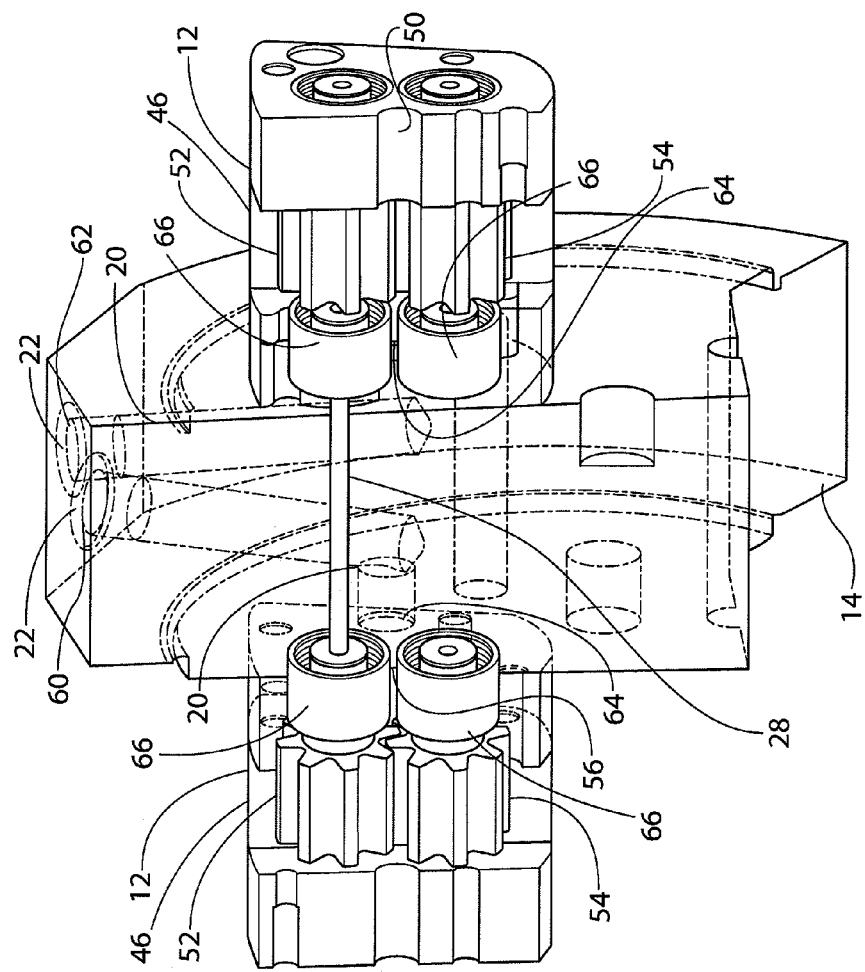
FIG. 4 is a partially sectional view of the dividing unit shown in FIG. 2.

FIGS. 2 and 4 depict a cutaway view and a partial sectional view, respectively, of an exemplary dividing unit 12 mounted to a support structure 14. The dividing unit 12 includes a housing 46 and rotating intermeshed gears 52, 54 within the housing. The dividing unit 12 may also include bearings 66 adjacent and axially aligned with the intermeshed gears 52, 54 that attach to respective connecting shafts 28. A inlet port 50 shown as a round passageway running through the dividing unit where the two rotating intermeshed gears 52, 54 diverge, that is, come out of mesh. The support structure 14 includes an aperture 56 that lines up with the inlet port 50 and connects with a similar round passageway through the dividing unit mounted to the opposite (distal) side of the support structure. As can best be seen in FIG. 4, on the far (right) interior facing side of the dividing unit 12, where the rotating gears come into mesh (e.g., converge), is a discharge passageway 64 that runs only through the back of the dividing unit, as readily understood by a skilled artisan. The discharge passageway 64 communicates with the aligned internal passage 20 in the support structure 14 that extends to port 60. In like manner, the discharge passageway 64 of the dividing unit 12 connected to the far side of the support structure communicates with another internal passage 20 of the support structure 14 that extends to port 62. That is, the internal passages 20 communicate fluid from the discharge passageways 64 of the coupled dividing units 12 to respective output ports 60, 62, 22.

Figure 3:
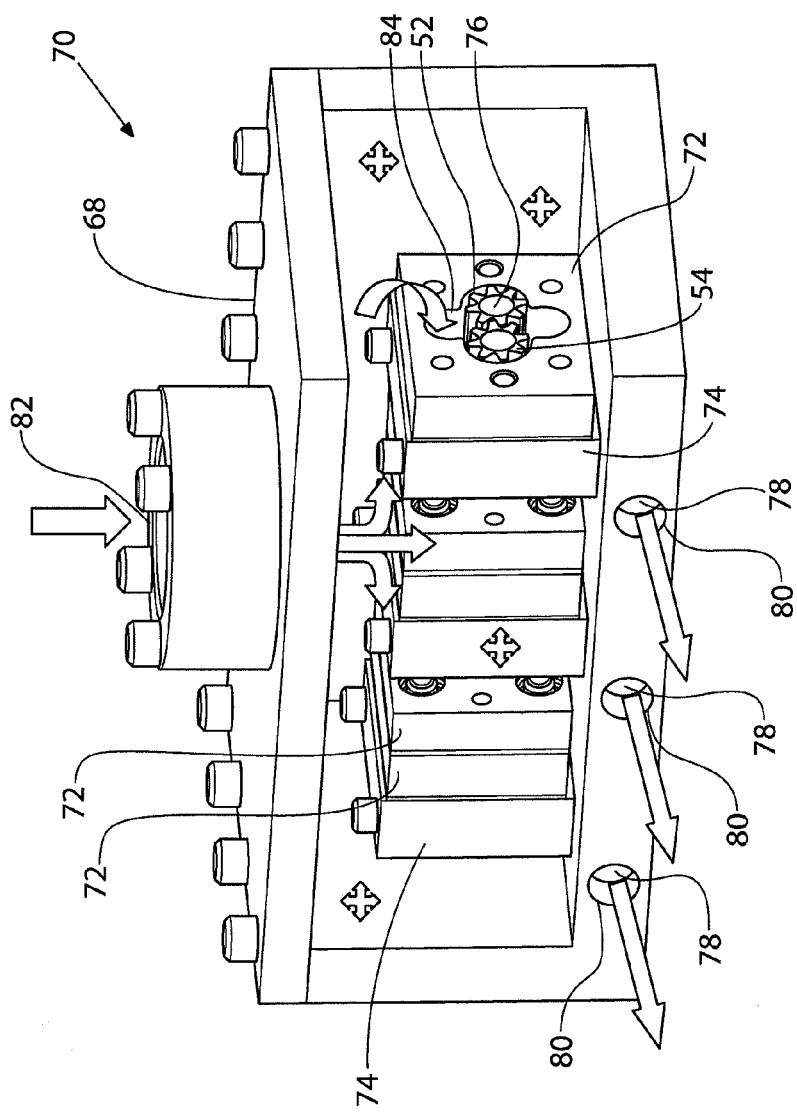
FIG. 3 is a partial view of a flow divider in accordance with another exemplary embodiment.

Another example of the preferred embodiments is depicted in FIG. 3, with arrows showing exemplary fluid flow. The flow divider illustrated in FIG. 3 includes the same dividing units, laid out in substantially the same linear fashion, and mechanically connect together to rotate at the same speeds in the same way. However, in this example, the pressure plenum flow divider 70 is a rectangular box shape instead of generally cylindrically shaped as the flow divider 10. The flow divider 70 includes a plenum 68 or pressure vessel that houses a plurality of dividing units 72, with some of the dividing units coupled to another dividing unit on one side, and/or to a support structure 74. For example, while not being limited to a particular theory or quantity, the flow divider 70 contains three support structures 74, with each support structure coupled to either one or two dividing units 72. The dividing units 72 are adjoined to other dividing units via connecting shafts 76 that mechanically and coaxially connect the driving gears within the adjoining dividing units 72 so the adjoined dividing units rotate at the same speed.

Of course it is understood that the preferred embodiments are not limited to a maximum of two adjoining dividing units 72 per support structure 74, as any number of adjoining dividing units are applicable within the scope of the invention. It should also be noted that the dividing units 72 and supporting structure 74 are substantially the same in structure and function as the dividing units 12 and supporting structures 14, 16, and 18, respectively, as discussed above even though the dividing units and supporting structures have different shapes. In other words, the structural elements of the flow dividers (e.g., dividing units, support structure, plenum, ports, passages, shafts) are not limited to the shape of the elements as shown by example herein.

Still referring to FIG. 3, each support structure 74 is attached to the plenum 68, and includes an interior passage within the structure. The passage in each support structure 74 provides liquid communication between the output port of the respectively coupled dividing unit 72 and a respective interior conduit 78 within the plenum, for providing fluid from the dividing unit to an output port 80 of the conduit. Accordingly the plenum 68 includes three output ports, one for each support structure 74. Of course, the plenum 68 also includes an input port 82 for receiving the fluid, as readily understood by a skilled artisan.

In operation, pressurized liquid from the pressurized liquid source first enters the plenum that contains the dividing units and functions as a pressure vessel. The liquid fuel enters the plenum input port 82 and fills the pressure vessel's volume so as to submerge the contained dividing units 72. The pressurized liquid fuel is forced into each exposed dividing unit through a respective inlet port 84. The dividing units 72 are subjected to only the much smaller pressure differences generated by the liquid passing through them, and pass the liquid to the support structures 74. The interior passage of the support structure passes the liquid to the conduits 78 of the plenum 68. The liquid then exits the flow divider 70 preferably at discharge line pressures via the output ports 80 of the plenum.

It is understood that the flow dividers 10 and 70, and the components and elements thereof are made of metal and/or alloy as preferred to withstand the forces and pressures exerted by and applied to the elements by mechanical and fluid force, as is readily understood by a skilled artisan.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims. Although specific terms are employed herein, they are used in a generic and descriptive sense only, and not for purposes of limitation.

What is claimed is:

1. A flow divider comprising a plurality of separate dividing units, each dividing unit including a housing containing intermeshing gears, each dividing unit being an independent stand-alone structure with its respective housing radially enclosing its respective plurality of intermeshed gears, the dividing units arranged so the intermeshing gears are coaxial, the dividing units connected together so that they all rotate together; a pressure containing vessel that encloses, and is separate from the dividing units, the pressure containing vessel being an inlet plenum conducting liquid to all of the dividing units simultaneously; and a support structure that secures each dividing unit with the respective housing of each dividing unit mounted to the support structure, said support structure including an individual outlet port for each dividing unit surrounded by the pressure containing vessel.

2. The flow divider of claim 1, wherein the dividing units are secured back to back on the support structure, so that the dividing units share the support structure, said support structure including separate outlet ports for each of the dividing units secured to the support structure.

3. The flow divider of claim 1, the support structure securing at least two of the dividing units, with the housing of the first one of the at least two dividing units mounted to the support structure and the second one of the at least two dividing units mounted to the first one of the at least two dividing units which is mounted to the support structure.

4. The flow divider of claim 1, the support structure securing at least two of the dividing units, with the housing of the first one of the at least two dividing units mounted to a first side of the support structure and the second one of the at least two dividing units mounted to a second side of the support structure opposite the first side of the support structure.

5. The flow divider of claim 1, wherein the separate dividing units are interchangeable.

6. A flow divider, comprising:
a plenum as a pressure containing vessel;
a plurality of separate dividing units including a first dividing unit, a second dividing unit and a third dividing unit with the first dividing unit between the second and third dividing units, the separate dividing units housed within and distinct from the plenum, each dividing unit including a housing and a plurality of intermeshed gears enclosed within the housing, each dividing unit being an independent stand-alone structure with its respective housing radially enclosing its respective intermeshed gears, each one of the plurality of intermeshed gears enclosed within the respective housing including a first gear intermeshed with a second gear, each dividing unit aligned with another one of the plurality of dividing units so that the intermeshed gears of the respective dividing units are coaxial;
a first connecting shaft mechanically connecting the first gear of the first dividing unit with the first gear of the second dividing unit to form first adjoining dividing units, the first gears of both of the adjoining dividing units being connected by the connecting shaft to rotate at the same speed a second connecting shaft mechanically connecting the first gear of the first dividing unit with the first gear of the third dividing unit to form second adjoining dividing units, the first dividing unit being adapted to be independently removed from said flow divider via disconnection from the first and second connecting shafts; and a support structure coupled to the plenum, the support structure securing at least two of the dividing units, with the housing of each of the at least two dividing units mounted to the support structure, and the support structure having an outlet port in fluid communication with the dividing units secured to the support structure.

7. The flow divider of claim 6, wherein the support structure securing the dividing units includes an independent outlet port for each dividing unit secured to the support structure.

8. The flow divider of claim 6, the support structure having a first side and a second side opposite the first side, and respective dividing units being secured to the support structure are coupled to both the first and second sides of the support structure with each respective secured dividing unit being in coaxial alignment with another one of the respective dividing units secured to the opposite side of the support structure.

9. The flow divider of claim 6, further comprising a plurality of support structures coupled to the plenum, each support structure securing at least one of the dividing units and having an outlet port in fluid communication with the dividing units secured to the support structure, said plenum including a plurality of exit ports coupled to respective conduits, each conduit in fluid communication with the outlet port of one of the support structures coupled to the plenum, each exit port therefore in fluid communication with one of the dividing units to expel fluid exiting the dividing unit.

10. The flow divider of claim 6, the support structure securing at least two of the dividing units, with the housing of the first one of the at least two dividing units mounted to the support structure and the second one of the at least two dividing units mounted to the first one of the at least two dividing units which is mounted to the support structure.

11. The flow divider of claim 6, the support structure securing at least two of the dividing units, with the housing of the first one of the at least two dividing units mounted to a first side of the support structure and the second one of the at least two dividing units mounted to a second side of the support structure opposite the first side of the support structure.

12. The flow divider of claim 6, wherein the separate dividing units are interchangeable.

13. The flow divider of claim 6, the support structure having a first side and a second side opposite the first side, a first one of the dividing units being secured to the first side of the support structure and a second one of the dividing units being secured to the second side of the support structure in coaxial alignment with the first one of the dividing units.

14. The flow divider of claim 13, a third one of the dividing units being secured to the first side of the support structure and a fourth one of the dividing units being secured to the second side of the support structure in coaxial alignment with the third one of the dividing units.

15. The flow divider of claim 6, wherein said plenum encloses said support structure.

16. The flow divider of claim 15, said plenum including an exit port, an input port and a conduit therebetween, the input port in fluid communication with the output port of the support structure, the exit port therefore in fluid communication with one of the dividing units to expel fluid exiting the dividing unit.

17. The flow divider of claim 6, further comprising a plurality of support structures coupled to the plenum, each support structure securing at least one of the dividing units and having an independent outlet port in fluid communication with each one of the dividing units secured to the support structure.

18. The flow divider of claim 17, said plenum including a plurality of pressure containing vessels, each pressure containing vessel being coupled to a plurality of the support structures.

19. The flow divider of claim 6, wherein the first dividing unit is removably mounted to the support structure independent of the second dividing unit.

20. The flow divider of claim 19, further comprising a gear unit mechanically coupled to at least one of the plurality of connecting shafts to mechanically link the intermeshed gears of the connected dividing units in linear fashion.

\* \* \* \* \*